United States Patent
Kim et al.

(10) Patent No.: US 8,891,031 B2
(45) Date of Patent: Nov. 18, 2014

(54) SENSING DEVICE AND METHOD OF SENSING A LIGHT BY USING THE SAME

(75) Inventors: Dong-Kwon Kim, Asan-si (KR);
Hyung-Guel Kim, Yongin-si (KR);
Jun-Ho Song, Seongnam-si (KR);
Nam-Heon Kim, Yongin-si (KR);
Joo-Hyung Lee, Seoul (KR);
Sung-Hoon Yang, Seoul (KR);
Kyung-Hun Yoon, Hwaseong-si (KR);
Myung-Hun Shin, Seoul (KR);
Jae-Hyun Cho, Seoul (KR)

(73) Assignee: Samsung Display Co., Ltd. (KR)

( * ) Notice: Subject to any disclaimer, the term of this patent is extended or adjusted under 35 U.S.C. 154(b) by 543 days.

(21) Appl. No.: 12/753,666

(22) Filed: Apr. 2, 2010

(65) Prior Publication Data
US 2011/0018893 A1    Jan. 27, 2011

(30) Foreign Application Priority Data
Jul. 27, 2009   (KR) .................. 10-2009-0068511

(51) Int. Cl.
*G02F 1/1335*  (2006.01)
*G02F 1/13*    (2006.01)
*G09G 3/36*    (2006.01)
*G06F 3/042*   (2006.01)
*G01J 1/02*    (2006.01)
*G06F 3/041*   (2006.01)
*G01J 1/42*    (2006.01)
*G01J 1/04*    (2006.01)

(52) U.S. Cl.
CPC ............ *G01J 1/02* (2013.01); *G01J 1/0219* (2013.01); *G01J 1/0209* (2013.01); *G06F 3/0412* (2013.01); *G01J 1/0488* (2013.01); *G06F 3/042* (2013.01); *G01J 1/4228* (2013.01)
USPC .............. 349/12; 349/199; 345/104; 345/175

(58) Field of Classification Search
USPC .............................. 349/12, 199; 345/173, 175
See application file for complete search history.

(56) References Cited

U.S. PATENT DOCUMENTS

| | | | | |
|---|---|---|---|---|
| 5,936,292 A | * | 8/1999 | Koide et al. | 257/412 |
| 5,965,916 A | * | 10/1999 | Chen | 257/347 |
| 7,804,493 B2 | * | 9/2010 | Gettemy | 345/175 |
| 8,350,827 B2 | * | 1/2013 | Chung et al. | 345/175 |
| 2005/0243023 A1 | | 11/2005 | Reddy et al. | |

(Continued)

FOREIGN PATENT DOCUMENTS

| | | | | |
|---|---|---|---|---|
| GB | WO 2009/066059 | * | 5/2009 | H01L 51/00 |
| JP | 2005-300630 A | | 10/2005 | |

(Continued)

*Primary Examiner* — Mark Robinson
*Assistant Examiner* — Robert Tavlykaev
(74) *Attorney, Agent, or Firm* — Innovation Counsel LLP

(57) ABSTRACT

In a sensing device and a method for sending a light by using the same, the sensing device includes: a lower panel; an upper panel facing the lower panel; a liquid crystal layer disposed between the lower panel and the upper panel; an infrared ray sensor formed in at least one of the lower panel and the upper panel; and a visible ray sensor formed in at least one of the lower panel and the upper panel. The sensing device simultaneously includes the infrared ray sensor and the visible ray sensor such that a touch sensing function or an image sensing function having high reliability may be realized.

25 Claims, 14 Drawing Sheets

(56) References Cited

U.S. PATENT DOCUMENTS

| | | | |
|---|---|---|---|
| 2006/0001914 A1* | 1/2006 | Mesmer et al. | 358/401 |
| 2006/0244693 A1* | 11/2006 | Yamaguchi et al. | 345/76 |
| 2007/0084989 A1 | 4/2007 | Lange et al. | |
| 2008/0122792 A1* | 5/2008 | Izadi et al. | 345/173 |

FOREIGN PATENT DOCUMENTS

| | | | |
|---|---|---|---|
| JP | 2006-018219 * | 1/2006 | G02F 1/133 |
| KR | 1020020028754 A | 4/2002 | |
| KR | 1020020040695 A | 5/2002 | |
| KR | 1020070008743 A | 1/2007 | |
| KR | 1020070062143 A | 6/2007 | |
| KR | 100809323 B1 | 2/2008 | |
| KR | 1020080028208 A | 3/2008 | |
| KR | 1020080028270 A | 3/2008 | |
| KR | 1020080058136 A | 6/2008 | |
| KR | 1020080067394 A | 7/2008 | |
| KR | 100873497 B1 | 12/2008 | |
| KR | 100879478 B1 | 1/2009 | |
| KR | 1020090006543 A | 1/2009 | |

* cited by examiner

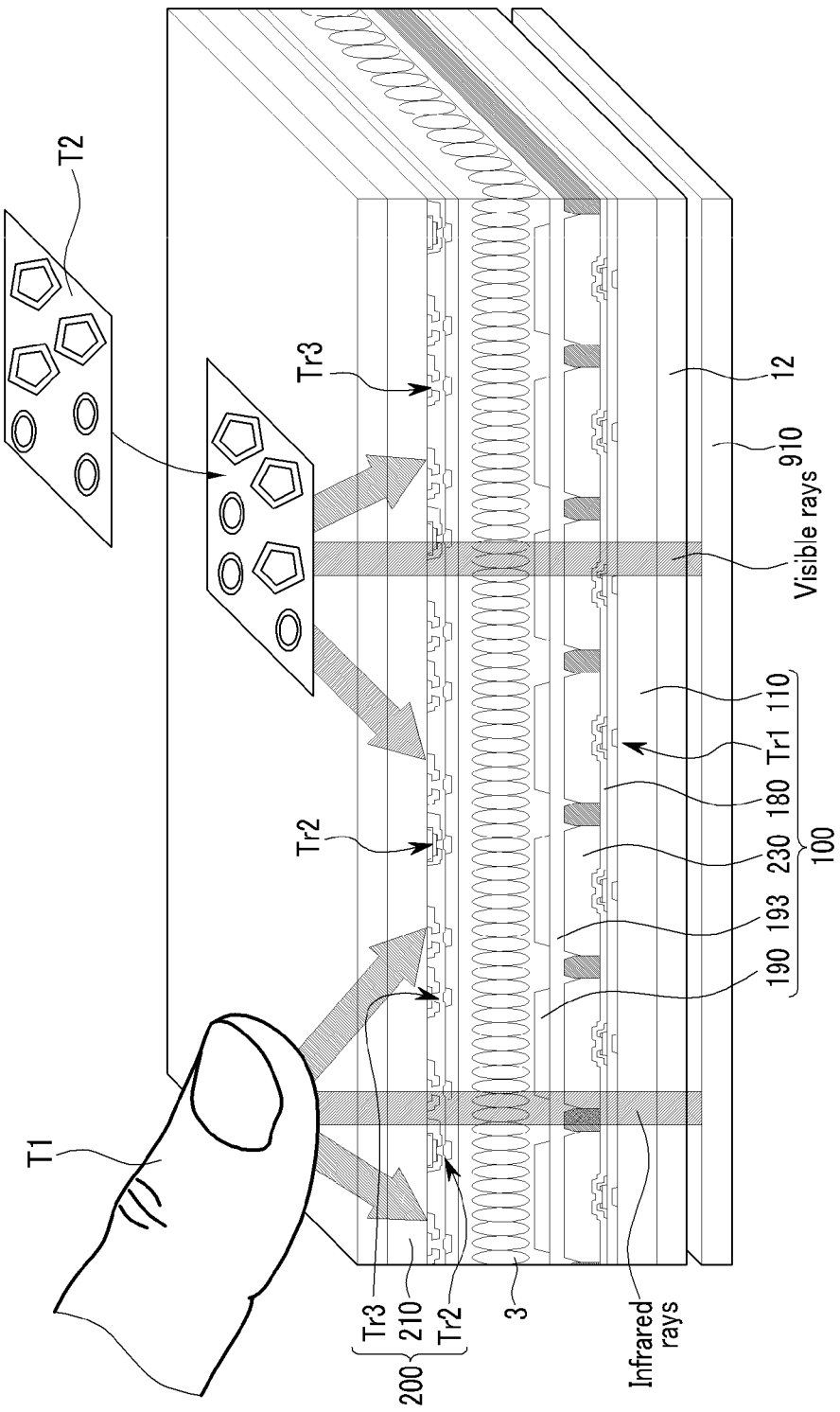

SENSING DEVICE AND METHOD OF SENSING A LIGHT BY USING THE SAME

CROSS-REFERENCE TO RELATED APPLICATION

This application claims priority to and the benefit of Korean Patent Application No. 10-2009-0068511 filed in the Korean Intellectual Property Office on Jul. 27, 2009, the entire contents of which are incorporated herein by reference.

BACKGROUND OF THE INVENTION (a) Field of the Invention

The present invention relates to a sensing device and a method for sensing light by using the same. More particularly, the present invention relates to a sensing device for sensing both infrared rays and visible rays, and a method for sensing such rays by using the same.

(b) Description of the Related Art

Currently, various flat panel displays are being developed and used. Among them, a liquid crystal display is widely used as a flat panel display.

Recently, liquid crystal displays that include a sensing device having a touch sensing function or an image sensing function have been actively researched. However, the conventional sensing device typically achieves the sensing function or the image sensing function through physical changes and therefore it is difficult to obtain high reliability with the conventional devices.

The above information disclosed in this Background section is only for enhancement of understanding of the background of the invention and therefore it may contain information that does not form the prior art that is already known to a person of ordinary skill in the art.

SUMMARY

In one aspect, the sensing device achieves a light sensing function having high reliability.

A method for sensing a light using the same is also provided.

According to one aspect, a sensing device includes: a lower panel; an upper panel facing the lower panel; a liquid crystal layer disposed between the lower panel and the upper panel; an infrared ray sensor formed in at least one of the lower panel and the upper panel; and a visible ray sensor formed in at least one of the lower panel and the upper panel.

The sensing device may further include a pixel transistor disposed in the lower panel. The lower panel may further include a color filter positioned on the pixel transistor.

The lower panel may further include a black matrix between the color filters, and the black matrix may overlap at least one of the infrared ray sensor and the visible ray sensor. The infrared ray sensor and the visible ray sensor may be formed in the upper panel.

In another aspect, a sensing device includes: a lower panel including a lower substrate and a pixel transistor disposed on the lower substrate; a liquid crystal layer disposed on the lower panel; and an upper panel disposed on the liquid crystal layer and including an upper substrate, an infrared ray sensor, a visible ray sensor, and a readout transistor connected to the infrared ray sensor or the visible ray sensor for transmitting a detection signal to a readout line. The lower panel may further include a color filter disposed on the pixel transistor.

The lower panel may further include a black matrix between the color filters, and the black matrix may overlap at least one of the infrared ray sensor and the visible ray sensor. The infrared ray sensor and the visible ray sensor may be disposed under the upper substrate. The infrared ray sensor and the visible ray sensor may be disposed on the upper substrate.

The sensing device may further include a backlight unit including at least one infrared ray emitting member and at least one visible ray emitting member disposed under the lower panel. The infrared ray emitting member and the visible ray emitting member may be light emitting diodes (LED), and the infrared rays and the visible rays respectively emitted from the infrared ray emitting member and the visible ray emitting member may be perpendicularly incident to the lower panel. The visible ray may be white light.

The sensing device may further include a lower polarizer disposed under the lower panel and an upper polarizer disposed on the upper panel. The sensing device may further include a lower IC unit electrically connected to the pixel transistor for driving the lower panel and disposed on the side of the lower panel, and an upper IC unit electrically connected to the infrared ray sensor and the visible ray sensor for driving the upper panel and disposed on the side of the upper panel.

The lower IC unit and the upper IC unit may not overlap each other. The lower IC unit and the upper IC unit may be opposite to each other with respect to the liquid crystal layer.

According to another aspect, a method for sensing light by using the sensing device is provided. In detail, the method includes: providing a sensing device including an infrared ray sensor and a visible ray sensor, and emitting an infrared ray and a visible ray; disposing an object close to the sensing device; and sensing the infrared ray or the visible ray reflected by the object through the infrared ray sensor or the visible ray sensor, thereby obtaining information of the object.

The information obtained by detecting the infrared ray reflected by the object through the infrared ray sensor may be contact information of the object, i.e. information regarding the position on the sensing device where the object has made contact, or come near to, the sensing device. The information obtained by detecting the visible ray reflected by the object through the visible ray sensor may be image information of the object.

For obtaining of the information, the contact position of the object may be recognized by detecting the infrared ray reflected by the object through the infrared ray sensor, and then the gray level of the visible ray that is provided to the contact position of the object is selectively changed, and thus image information of the object is recognized by detecting the visible rays reflected by the object through the visible ray sensor.

Selectively changing the gray level of the visible ray may be to control the gray level of the sensing device. The sensing device may include a lower panel, an upper panel facing the lower panel, and a liquid crystal layer disposed between the lower panel and the upper panel, the infrared ray sensor is formed in at least one of the lower panel and the upper panel, and the visible ray sensor is formed in at least one of the lower panel and the upper panel. The sensing device may further include a pixel transistor positioned in the lower panel.

The infrared ray sensor and the visible ray sensor may be formed in the upper panel. The infrared ray sensor may include a visible ray blocking film, and the visible ray blocking film may reduce the amount of visible rays incident to the infrared ray sensor such that the sensitivity of the infrared ray sensor to infrared rays may be increased. According to an exemplary embodiment of the present invention, when the lower panel includes the pixel transistor, a light sensing element may be disposed in the upper panel such that the wiring of the lower panel may be simple. Accordingly, signal coupling generated in the lower panel may be reduced.

Also, the light sensing element is positioned in the upper panel such that the sensitivity of the light sensing element, which is decreased when the light sensing element is positioned in the lower panel, may be increased. Also, when the light sensing element is formed under the upper substrate included in the upper panel, the light sensing element may be effectively protected from external impact.

Also, the lower IC unit connected to the lower panel and the upper IC unit connected to the upper panel are separated and are overlapped, such that EMI between the IC units may be reduced.

Also, the visible ray blocking film may block the visible rays provided from outside of the sensing device so that the light [sensing] element may sense the infrared ray such that the signal to noise ratio (SNR) may be improved and the sensitivity may be optimized to the infrared ray region.

Also, the infrared ray sensor and the visible ray sensor are used simultaneously, such that the touch sensing by the infrared ray sensor and the image sensing by the visible ray sensor may be simultaneously executed.

Also, the gray level of the visible rays provided to the portion of the sensing device in which contact with the object is detected is changed after the contact portion of the object is recognized through the infrared ray sensor such that the image sensing may be further effectively executed.

BRIEF DESCRIPTION OF THE DRAWINGS

FIG. 14 is a view for explaining a method for sensing light using a sensing device according to an exemplary embodiment.

DESCRIPTION OF REFERENCE NUMERALS INDICATING PRIMARY ELEMENTS IN THE DRAWINGS

Figure 1:
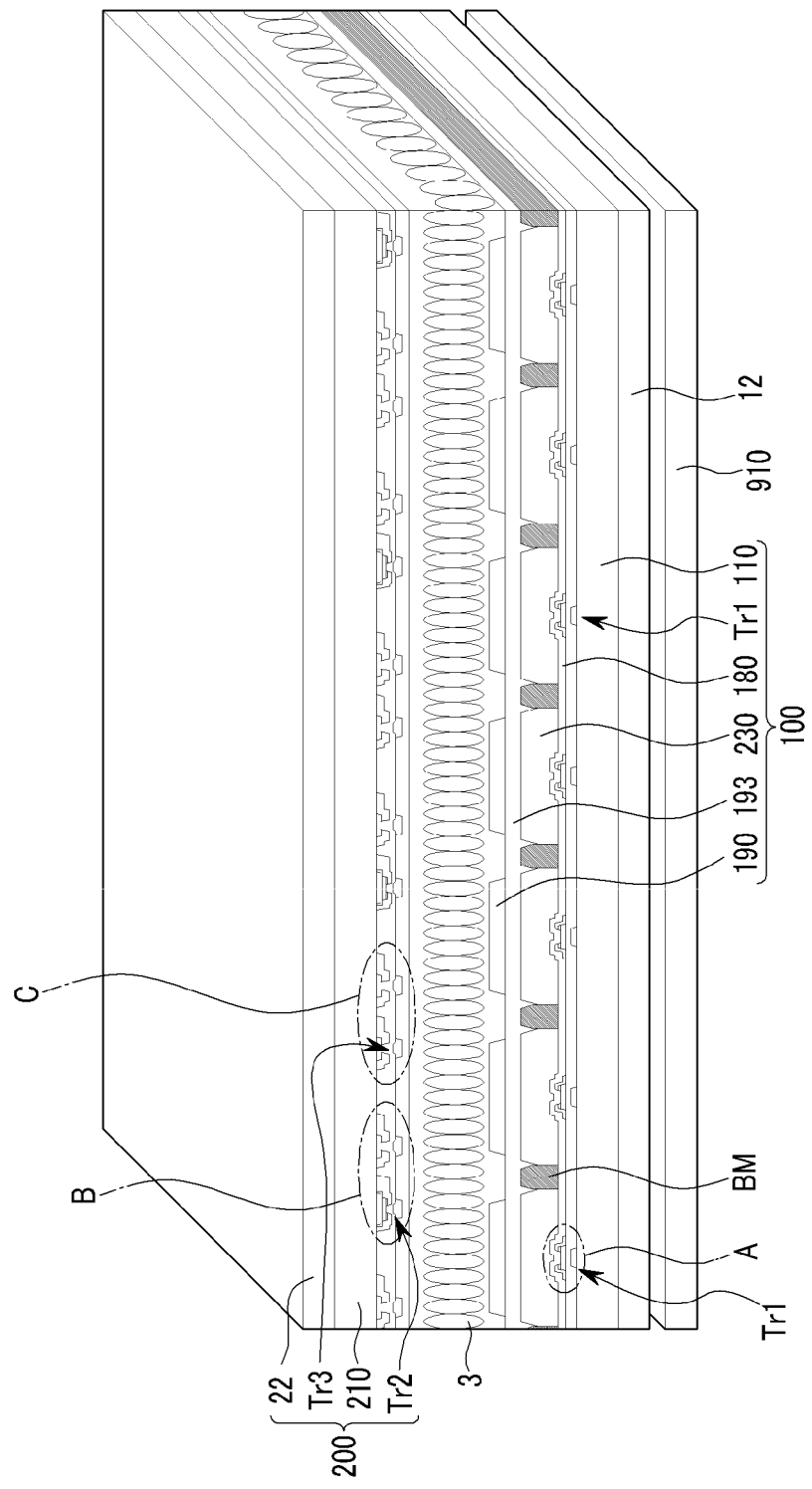
FIG. 1 is a perspective view of a sensing device according to an exemplary embodiment.

| 3: | liquid crystal layer | 12: | lower polarizer |
|---|---|---|---|
| 22: | upper polarizer | 100: | lower panel |
| 110: | lower substrate | 111: | visible ray blocking film |
| 124a, 124b, 124c, 124r: | gate electrode | 140a, 140b, 140c, 140r: | gate insulating layer |
| 154a: | semiconductor layer | 154r: | semiconductor layer |

-continued

| 154b, 154c, 173a, 173b, 173c, 173r: | active layer source electrode | 164a, 164b, 164c, 164r: 175a, 175b, 175c, 175r: | ohmic contact layer drain electrode |
|---|---|---|---|
| 180: | passivation layer | 190: | pixel electrode |
| 193, 194: | insulating layer | 200: | upper panel |
| 210: | upper substrate | 540a: | lower IC unit |
| 540b: | upper IC unit | 910: | backlight unit |
| 911: | infrared ray emitting member | 912: | visible ray emitting member |

DETAILED DESCRIPTION OF THE EMBODIMENTS

Exemplary embodiments of a sensing device and a method for sensing light by using the same will hereinafter be described in detail with reference to the accompanying drawings.

The structural shapes, sizes, ratios, numbers, etc., are schematically illustrated in the accompanying drawings such that they may be altered. The drawings are shown from a particular viewpoint of observation and the direction or location for explaining the drawings may be variously changed depending upon the position of the observer. Even when reference is made to different elements, like reference numerals may be used to designate those elements.

When the terms "include," "have," "consist of," or the like are used, the relevant subject may include other parts unless the term "only" is used to define the contents thereof. When explanation is made using a singular term, it may be interpreted in a plural manner as well as in a singular manner. Even when the numerical values, shapes, size comparisons, positional relations, etc. are not explained with the adverb "about" or "substantially," they may be so interpreted as to include the common error ranges. Even when the terms "after," "before," "and," "here," "subsequently," or the like are introduced, they are not meant to define temporal locations. The terms "the first," "the second," etc. are used only for convenience in distinction, selectively, commutatively, or repeatedly, and are not meant to be read in any defined manner. It will be understood that when an element is referred to as being "on," "over," "above," "below," or "beside" another element, it can be directly on the other element or one or more intervening elements may also be present. When the connective word "or" is used to connect two elements, it indicates the respective elements and a combination thereof, but when the quantifier "any one of" is used, it indicates only the respective element.

Figure 2:
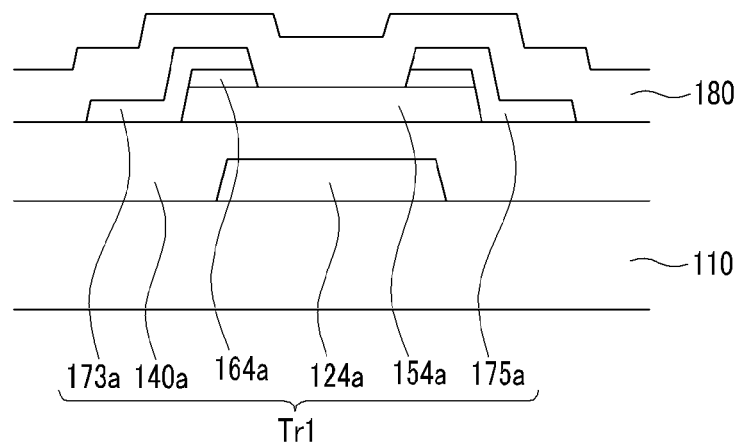
FIG. 2 is an enlarged view of the "A" portion of FIG. 1.
Figure 3:
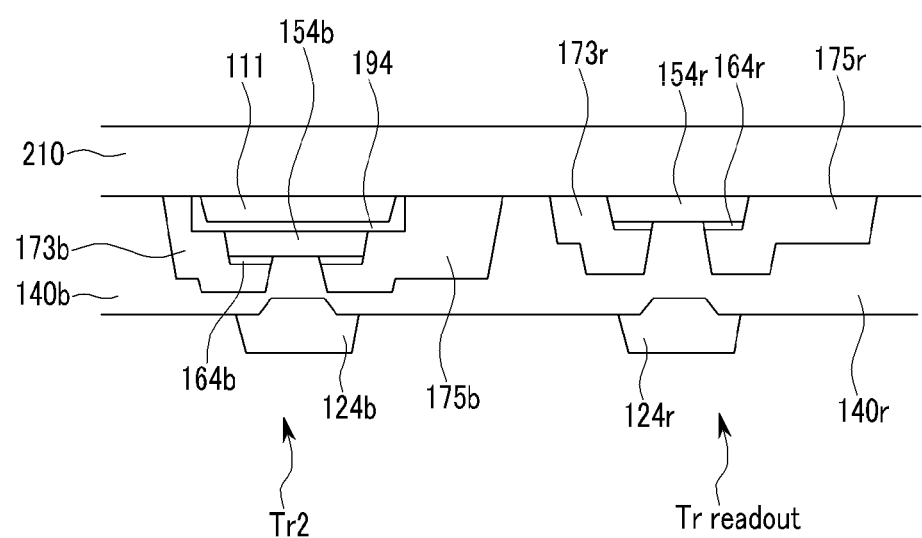
FIGS. 3 and 4 are enlarged views of the "B" portion of FIG. 1.
Figure 4:
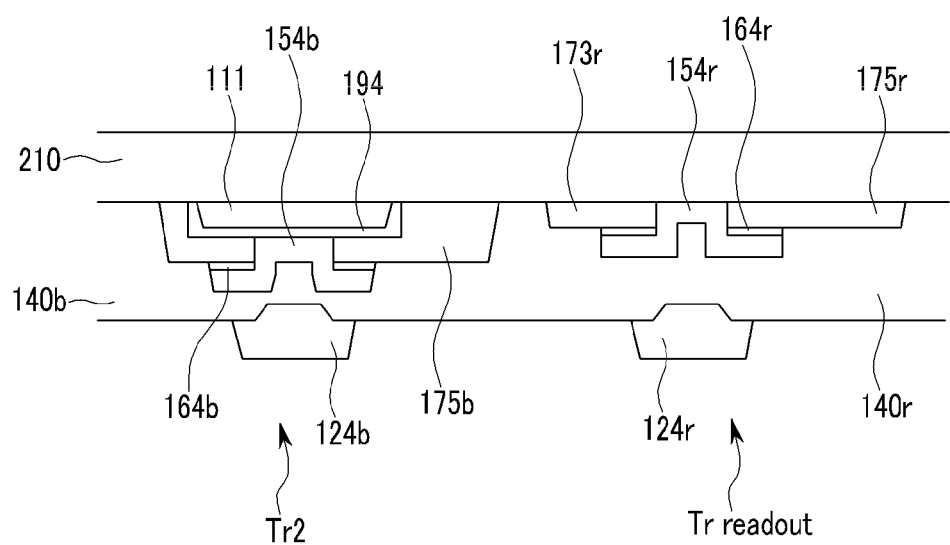
Figure 5:
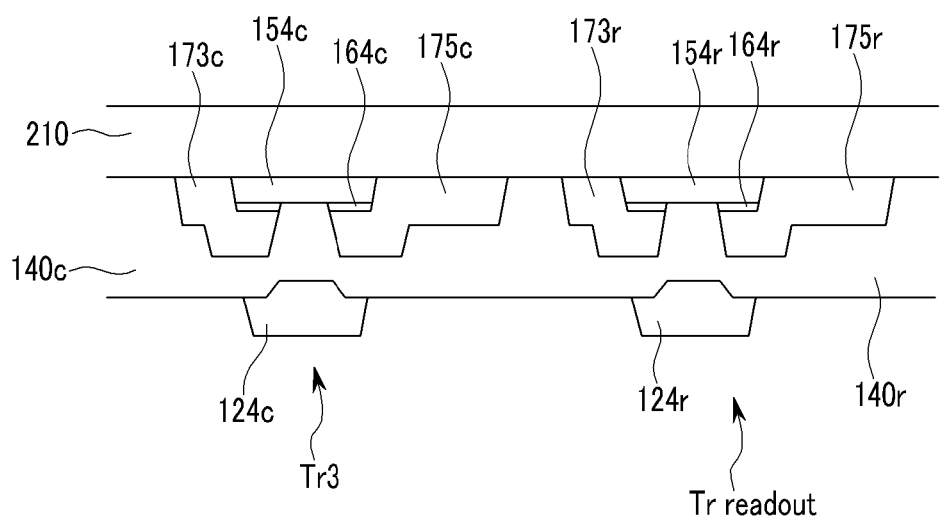
FIGS. 5 and 6 are enlarged views of the "C" portion of FIG. 1.
Figure 6:
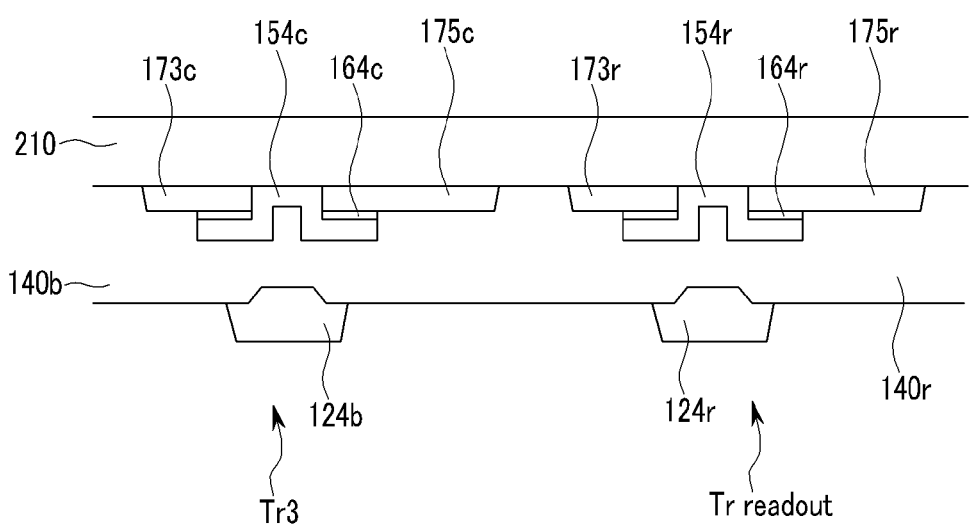
Figure 7:
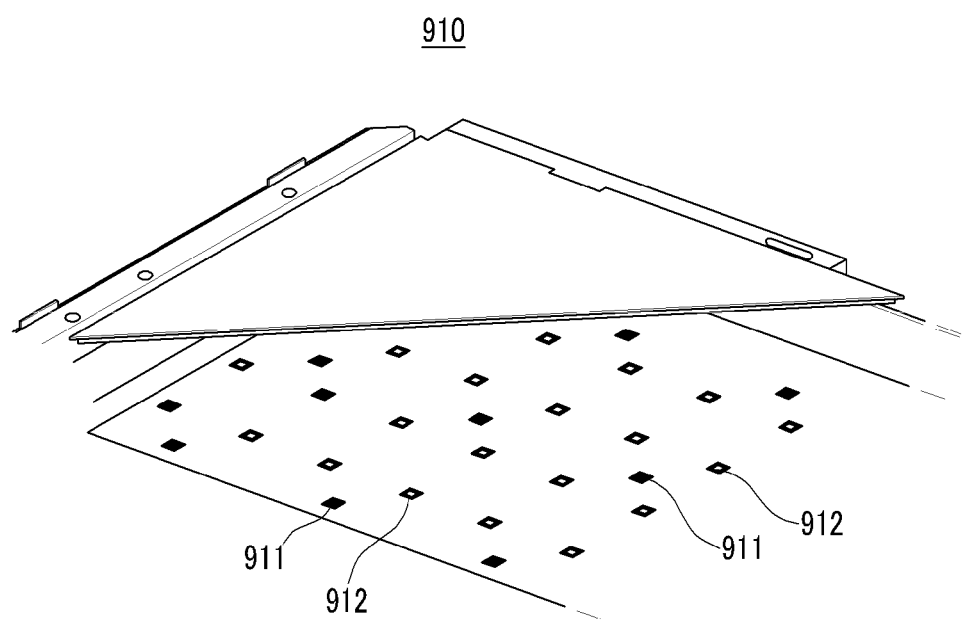
FIG. 7 is a partially cut-away perspective view of the backlight unit shown in FIG. 1.
Figure 8:
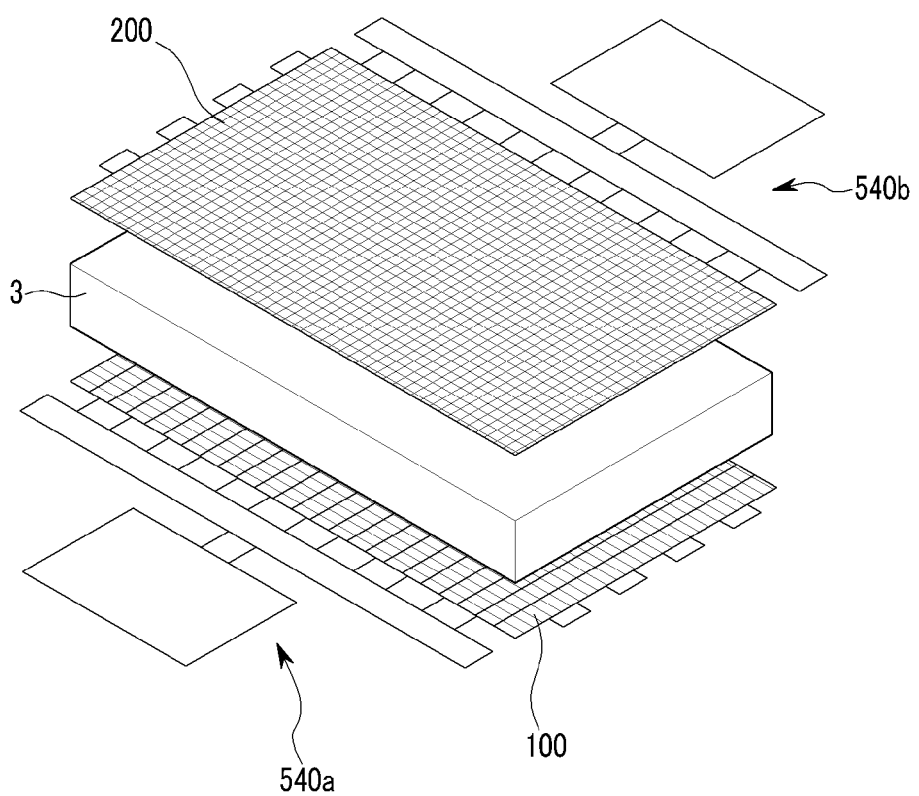
FIG. 8 is a perspective view of a circuit integrated unit according to the present exemplary embodiment.

FIG. 1 is a perspective view of a sensing device according to an exemplary embodiment. FIG. 2 is an enlarged view of the "A" portion of FIG. 1. FIGS. 3 and 4 are enlarged views of the "B" portion of FIG. 1. FIGS. 5 and 6 are enlarged views of the "C" portion of FIG. 1. FIG. 7 is a partially cut-away perspective view of the backlight unit shown in FIG. 1. FIG. 8 is a perspective view of a circuit integrated unit according to the present exemplary embodiment.

Referring to FIG. 1, a sensing device includes a lower panel 100, a liquid crystal layer 3 disposed on the lower panel 100, and an upper panel 200 disposed on the liquid crystal layer 3.

The lower panel 100 includes a lower substrate 110 and a pixel transistor $Tr_1$ disposed on the lower substrate 110. Referring to FIG. 2, which is an enlarged view of the portion "A" of FIG. 1 where a pixel transistor $Tr_1$ is positioned, pixel transistor $Tr_1$ includes a gate electrode 124a, a gate insulating layer 140a disposed on the gate electrode 124a, a semiconductor layer 154a overlapping the gate electrode 124a and disposed on the gate insulating layer 140a, an ohmic contact layer 164a disposed on the semiconductor layer 154a, a source electrode 173a disposed on the ohmic contact layer 164a, and a drain electrode 175a separated from the source electrode 173a on the ohmic contact layer 164a.

The lower panel 100 may further include a gate line disposed on the lower substrate 110 and a data line intersecting the gate line. The gate line may be connected to the gate electrode 124a of the pixel transistor $Tr_1$. The data line may also be connected to the source electrode 173a of the pixel transistor $Tr_1$.

The lower panel 100 may further include, FIG. 1, a passivation layer 180 disposed on the pixel transistor $Tr_1$, color filters 230 disposed on the passivation layer 180, a black matrix BM disposed between the color filters 230, an insulating layer 193 disposed on the color filter 230, and a pixel electrode 190 disposed on the insulating layer 193. The pixel electrode 190 may be connected to the drain electrode 175a of the pixel transistor $Tr_1$ while passing through the insulating layer 193 and the passivation layer 180.

The upper panel 200 includes an upper substrate 210 and light sensing elements $Tr_2$ and $Tr_3$. The light sensing element $Tr_2$ and $Tr_3$ may include at least one infrared ray sensor $Tr_2$ and at least one visible ray sensor $Tr_3$. The infrared ray sensor $Tr_2$ and the visible ray sensor $Tr_3$ formed in the upper panel 200 may overlap the black matrix BM of the lower panel 100. That is, the black matrix BM of the lower panel 100 may vertically correspond to the light sensing elements $Tr_2$ and $Tr_3$. In such case, the aperture ratio may be improved.

The infrared ray sensor $Tr_2$ and the visible ray sensor $Tr_3$ may be arranged in an alternating manner. As another example, the infrared ray sensor $Tr_2$ and the visible ray sensor $Tr_3$ may be arranged unsystematically. As another example, the infrared ray sensor $Tr_2$ and the visible ray sensor $Tr_3$ may be arranged in a predetermined ratio. In this case, the ratio of the number of infrared ray sensors $Tr_2$ and the visible ray sensors $Tr_3$ may be about 1:1, and may be arranged in an alternating manner.

The upper panel 200 may further include a readout line connected to the light sensing elements $Tr_2$ and $Tr_3$ and transmitting a signal detected from the light sensing elements $Tr_2$ and $Tr_3$ and a readout transistor $Tr_{readout}$ disposed between the light sensing elements $Tr_2$ and $Tr_3$. Here, the readout transistor $Tr_{readout}$ may be disposed with the same layer as the light sensing elements $Tr_2$ and $Tr_3$ and closely thereto.

The infrared ray sensor $Tr_2$ and the visible ray sensor $Tr_3$ may be disposed under the upper substrate 210. FIG. 3 shows an enlarged infrared ray sensor $Tr_2$ and the readout transistor $Tr_{readout}$ disposed in the "B" portion of FIG. 1. The infrared ray sensor $Tr_2$ is disposed under the upper substrate 210, and the readout transistor $Tr_{readout}$ that is electrically connected to the infrared ray sensor $Tr_2$ is disposed within the same layers as the infrared ray sensor $Tr_2$.

In detail, the infrared ray sensor $Tr_2$ may include an active layer 154b, an ohmic contact layer 164b, a source electrode 173b, a drain electrode 175b, a gate insulating layer 140b, and a gate electrode 124b.

The active layer 154b is disposed under the upper substrate 210, and may include at least one material selected from the group including amorphous germanium, amorphous silicon-germanium, and micro-crystalline silicon. The ohmic contact layer 164b may be disposed under the active layer 154b. The source electrode 173b may be disposed under the ohmic contact layer 164b. The source electrode 173b may be disposed separately under the drain electrode 175b and the ohmic contact layer 164b. The gate insulating layer 140b may be disposed under the active layer 154b, the source electrode 173b, and the drain electrode 175b. The gate electrode 124b may overlap the active layer 154b under the gate insulating layer 140b.

The infrared ray sensor $Tr_2$ may further include a visible ray blocking film 111 disposed on the active layer 154b and overlapping the active layer 154b. In detail, the visible ray blocking film 111 may be disposed between the upper substrate 210 and the active layer 154b. Here, an insulating layer 194 that includes an insulating material such as silicon nitride may be disposed between the visible ray blocking film 111 and the active layer 154b.

The visible ray blocking film 111 may include a material for blocking the visible rays provided from the outside of the sensing device. For example, the visible ray blocking film 111 may include an organic material or amorphous silicon including a black pigment.

The visible ray blocking film 111 blocks visible rays that are incident to the sensing device, thereby improving the signal to noise ratio (SNR). Additionally, the sensitivity of the active layer 154b including the amorphous silicon-germanium is optimized to the infrared ray region such that the effect of the visible rays on the active layer 154b is efficiently prevented.

The readout transistor $Tr_{readout}$ may include a semiconductor layer 154r, an ohmic contact layer 164r, a source electrode 173r, a drain electrode 175r, a gate insulating layer 140r, and a gate electrode 124r.

The semiconductor layer 154r may be disposed under the upper substrate 210. The ohmic contact layer 164r may be disposed under the semiconductor layer 154r. The source electrode 173r may be disposed under the ohmic contact layer 164r. The drain electrode 175r may be disposed under the ohmic contact layer 164r and separated from the source electrode 173r. The gate insulating layer 140r may be disposed under the semiconductor layer 154r, the source electrode 173r, and the drain electrode 175r. The gate electrode 124r may be disposed under the gate insulating layer 140r and overlap the semiconductor layer 154r.

FIG. 4 is an enlarged cross-sectional view of an infrared ray sensor $Tr_2$ and a readout transistor $Tr_{readout}$ according to another exemplary embodiment. The infrared ray sensor $Tr_2$ and the readout transistor $Tr_{readout}$ shown in FIG. 4 are substantially the same as those of FIG. 3, except for the positional relationships of the elements, and therefore the same reference numerals are used to refer to the same elements.

Referring to FIG. 4, the infrared ray sensor $Tr_2$ is disposed under the upper substrate 210. The readout transistor $Tr_{readout}$ that is electrically connected to the infrared ray sensor $Tr_2$ is disposed within the same layers as the infrared ray sensor $Tr_2$.

In detail, the infrared ray sensor $Tr_2$ may include an active layer 154b, an ohmic contact layer 164b, a source electrode 173b, a drain electrode 175b, a gate insulating layer 140b, and a gate electrode 124b.

The source electrode 173b and the drain electrode 175b are separated from each other and are disposed under the upper substrate 210. The active layer 154b overlaps the source electrode 173b and the drain electrode 175b, and is disposed under the source electrode 173b and the drain electrode 175b. The ohmic contact layer 164b is disposed between the active layer 154b and the source electrode 173b, and the active layer 154b and the drain electrode 175b.

The gate insulating layer 140b may be disposed under the active layer 154b, the source electrode 173b, and the drain electrode 175b. The gate electrode 124b may be disposed under the gate insulating layer 140b while overlapping the active layer 154b.

The infrared ray sensor Tr$_2$ further includes the visible ray blocking film 111 overlapping the active layer 154b and disposed on the active layer 154b. In detail, the visible ray blocking film 111 may be disposed between the upper substrate 210 and the active layer 154b. Here, an insulating layer 194 that includes an insulating material such as silicon nitride may be disposed between the visible ray blocking film 111 and the active layer 154b.

The readout transistor Tr$_{readout}$ may include a semiconductor layer 154r, an ohmic contact layer 164r, a source electrode 173r, a drain electrode 175r, a gate insulating layer 140r, and a gate electrode 124r.

The source electrode 173r and drain electrode 175r are separated from each other and are disposed under the upper substrate 210. The semiconductor layer 154r is disposed under the source electrode 173r and the drain electrode 175r so that it is overlapped with the source electrode 173r and the drain electrode 175r.

The ohmic contact layer 164r may be disposed between the semiconductor layer 154r and the source electrode 173r, and the semiconductor layer 154r and the drain electrode 175r. The gate insulating layer 140r may be disposed under the semiconductor layer 154r, the source electrode 173r, and the drain electrode 175r. The gate electrode 124r may be disposed under the gate insulating layer 140r so that it is overlapped with the semiconductor layer 154r.

Referring to FIG. 5 which shows an enlarged view of the visible ray sensor Tr$_3$ and the readout transistor Tr$_{readout}$ that are positioned in the "C" portion of FIG. 1, the visible ray sensor Tr$_3$ is positioned under the upper substrate 210 and the readout transistor Tr$_{readout}$ that is electrically connected to the visible ray sensor Tr$_3$ is disposed within the same layers as the visible ray sensor Tr$_3$.

In detail, the visible ray sensor Tr$_3$ may include an active layer 154c, an ohmic contact layer 164c, a source electrode 173c, a drain electrode 175c, a gate insulating layer 140c, and a gate electrode 124c.

The active layer 154c is positioned under the upper substrate 210 and may include amorphous silicon. The ohmic contact layer 164c may be positioned under the active layer 154c. The source electrode 173c may be positioned under the ohmic contact layer 164c. The drain electrode 175c is separated from the source electrode 173c and may be positioned under the ohmic contact layer 164c. The gate insulating layer 140c may be positioned under the active layer 154c, the source electrode 173c, and the drain electrode 175c. The gate electrode 124c may be overlapped with the active layer 154c under the gate insulating layer 140c. Also, the readout transistor Tr$_{readout}$ is substantially the same as that of FIG. 3 above, such that the description thereof is omitted here.

In structures of the liquid crystal displays, all of the pixel transistors, the light sensing elements, and the readout transistors may be formed in the lower panel, and only a color filter may be formed in the upper panel. In such case, the relationship between the wiring of the lower panel is complicated such that signal coupling may be generated between the neighboring wiring. Also, when the light sensing element is positioned in the lower panel, the sensitivity for light is reduced, which can cause a problem in that the reliability of the sensing function, which senses the light, is low.

However, in the present exemplary embodiment, the light sensing elements Tr$_2$ and Tr$_3$ and the readout transistor Tr$_{readout}$ are positioned in the upper panel 200, the pixel transistor Tr$_1$ is formed in the lower panel 100, and the color filter is formed in the lower panel 100 such that the signal coupling problem generated in the lower panel may be solved. Also, the light sensing elements Tr$_2$ and Tr$_3$ are formed in the upper panel 200 such that the sensitivity for the light is increased, and thereby the reliability of the sensing function for sensing the light may be increased.

Also, the touch sensing function is executed through the infrared ray sensor Tr$_2$ such that the contact information for the object, i.e., the position on the sensing device, may be obtained in a state in which the object is substantially close to the sensing device or does not contact it.

Also, in the present exemplary embodiment, the light sensing elements Tr$_2$ and Tr$_3$ and the readout transistor Tr$_{readout}$ are positioned under the upper substrate 210 such that the light sensing elements Tr$_2$ and Tr$_3$ and the readout transistor Tr$_{readout}$ may be prevented from being damaged by external impact.

FIG. 6 is an enlarged view of a visible ray sensor Tr$_3$ and a readout transistor Tr$_{readout}$ according to another exemplary embodiment of the present invention. The infrared ray sensor Tr$_2$ and the readout transistor Tr$_{readout}$ shown in FIG. 6 are substantially the same as those of FIG. 5, except for the positional relationships of the elements, so that the same reference numerals are used to refer to the same elements.

Referring to FIG. 6, the visible ray sensor Tr$_3$ may include an active layer 154c, an ohmic contact layer 164c, a source electrode 173c, a drain electrode 175c, a gate insulating layer 140c, and a gate electrode 124c.

The source electrode 173c and drain electrode 175c are disposed under the upper substrate 210 and are separated from each other. The active layer 154c is disposed under the source electrode 173c and the drain electrode 175c while overlapping the source electrode 173c and the drain electrode 175c. The ohmic contact layer 164c may be disposed between the active layer 154c and the source electrode 173c, and the active layer 154c and the drain electrode 175c. The gate insulating layer 140c may be positioned under the active layer 154c, the source electrode 173c, and the drain electrode 175c. The gate electrode 124c may be positioned under the gate insulating layer 140c so that it is overlapped with the active layer 154c. The readout transistor Tr$_{readout}$ is substantially the same as that of FIG. 4 above, so that the description thereof is omitted here.

The sensing device further includes a lower polarizer 12 disposed under the lower panel 100 and an upper polarizer 22 disposed on the upper panel 200. The intensity of the light provided to the lower panel 100 and the upper panel 200 is controlled by using the polarization characteristics of the lower polarizer 12 and the upper panel 200.

The sensing device may further include a backlight unit 910 disposed under the lower panel 100. FIG. 7 is the partially cut-away perspective view of the backlight unit 910 shown in FIG. 1. Referring to FIG. 7 the backlight unit 910 includes at least one infrared ray emitting member 911 and at least one visible ray emitting member 912. The infrared ray emitting member 911 and the visible ray emitting member 912 may be a point light source such as a light emitting diode (LED). Also, the infrared rays and the visible rays that are emitted from the infrared ray emitting member 911 and the visible ray emitting member 912, respectively, may be perpendicularly incident to the lower panel 100. Here, the visible rays may be white light.

The infrared ray emitting member 911 and the visible ray emitting member 912 may be uniformly distributed on the whole backlight unit 910 to provide the infrared rays and the visible rays to the entirety of the backlight unit 910. As one example, the infrared ray emitting members 911 and the visible ray emitting members 912 may be arranged in an alternating manner. As another example, the infrared ray emitting members 911 and the visible ray emitting members 912 may be unsystematically arranged. As another example, the infrared ray emitting members 911 and the visible ray emitting members 912 may be arranged in a predetermined ratio. In this case, the infrared ray emitting members 911 and the visible ray emitting members 912 may be arranged in an alternating manner and in a ratio of 1:1.

Referring to FIG. 8, the sensing device may further include a lower IC unit 540a that is electrically connected to the pixel transistor $Tr_1$ for driving the lower panel 100 and that is positioned on the side of the lower panel 100. The sensing device may further include and an upper IC unit 540b that is electrically connected to the light sensing elements $Tr_2$ and $Tr_3$ for driving the upper panel 200 and that is positioned on the side of the upper panel 200.

Here, the lower IC unit 540a and the upper IC unit 540b are positioned so that they are not overlapped with each other. For example, the lower IC unit 540a and the upper IC unit 540b may be opposite to each other with respect to the liquid crystal layer 3.

The lower IC unit 540a is connected to the data line that is connected to the source electrode 173a of the pixel transistor $Tr_1$, thereby receiving and transmitting the electric signals with the pixel transistor $Tr_1$. The upper IC unit 540b is connected to the data line that is connected to the source electrode 173b of the infrared ray sensor $Tr_2$ or the source electrode 173c of the visible ray sensor $Tr_3$, thereby receiving and transmitting the electric signals with the infrared ray sensor $Tr_2$ or the visible ray sensor $Tr_3$. On the other hand, the upper IC unit 540b may be connected to the readout line connected to the source electrode 173r of the readout transistor $Tr_{readout}$, thereby receiving and transmitting the electric signals with the readout transistor $Tr_{readout}$.

In structures of liquid crystal displays, the lower panel may include the pixel transistors, the light sensing elements, and the readout transistors, and the upper panel may only include the color filter. In such case, the wiring relationship of the lower panel is not only complicated, but also the IC units connected to the wiring must be formed on the side portion of the lower panel, and therefore there is a problem in that EMI is generated between the IC units.

However, according to the present exemplary embodiment, the lower panel 100 includes the lower IC unit 540a by forming the pixel transistor $Tr_1$, the upper panel 200 includes the upper IC unit 540b by forming the light sensing elements $Tr_2$ and $Tr_3$, the readout transistor $Tr_{readout}$ is separated from the lower IC unit 540a, and the lower IC unit 540a does not overlap the upper IC unit 540b so that the EMI may be minimized.

In the above-described exemplary embodiments, the infrared ray sensor $Tr_2$ and the visible ray sensor $Tr_3$ are both formed in the upper panel 200, however the positions of the infrared ray sensor $Tr_2$ and the visible ray sensor $Tr_3$ may be variously changed.

That is, the infrared ray sensor $Tr_2$ may be formed in at least one of the lower panel 100 and the upper panel 200, and the visible ray sensor $Tr_3$ may also be formed in at least one of the lower panel 100 and the upper panel 200.

As one example, the infrared ray sensor $Tr_2$ may be formed in the upper panel 200, and the visible ray sensor $Tr_3$ may be formed in the lower panel 100. As another example, the visible ray sensor $Tr_3$ may be formed in the upper panel 200, and the infrared ray sensor $Tr_2$ may be formed in the lower panel 100.

Figure 9:
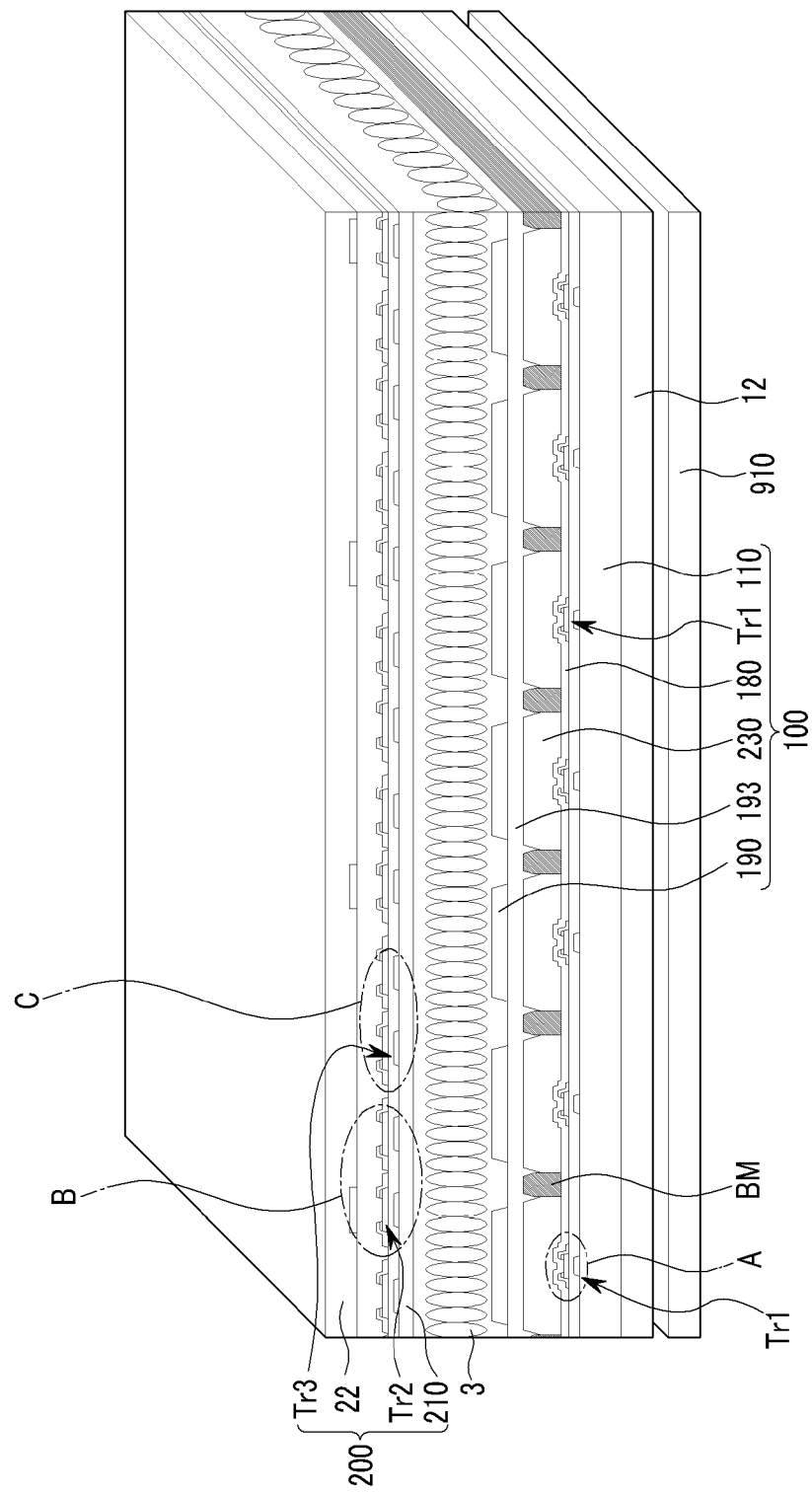
FIG. 9 is a perspective view of a sensing device according to an exemplary embodiment.
Figure 10:
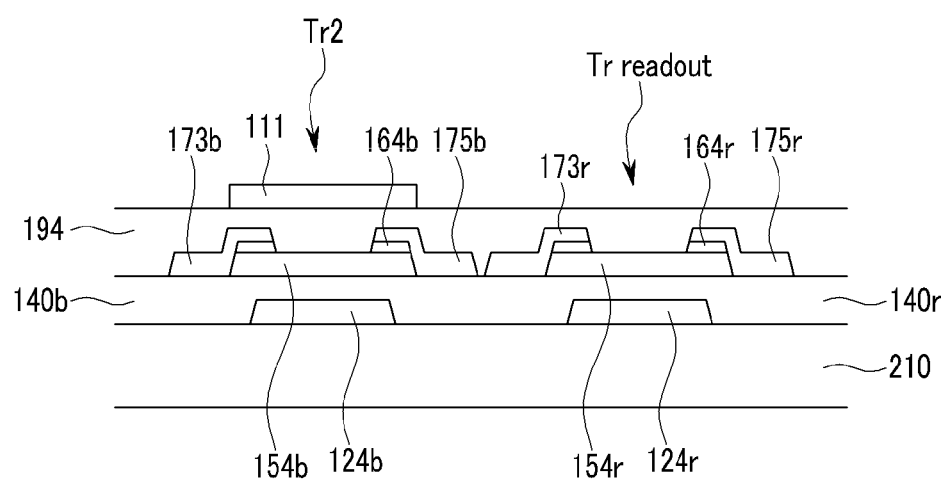
FIG. 10 is an enlarged view of the "B" portion of FIG. 9.
Figure 12:
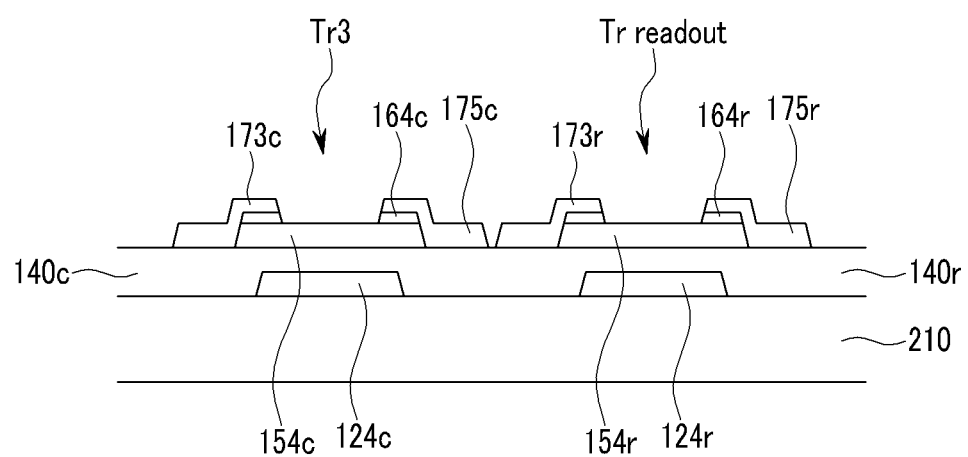
FIG. 12 is an enlarged view of the "C" portion of FIG. 9.

FIG. 9 is a perspective view of a sensing device according to an exemplary embodiment. FIG. 10 is an enlarged view of the "B" portion of FIG. 9. FIG. 12 is an enlarged view of the "C" portion of FIG. 9.

The present exemplary embodiment is the same as that of the exemplary embodiments shown in FIGS. 1 to 6 except for the structure of the light sensing elements $Tr_2$ and $Tr_3$ and the readout transistor $Tr_{readout}$ such that the overlapping description is omitted. Here, the light sensing elements $Tr_2$ and $Tr_3$ and the readout transistor $Tr_{readout}$ may be positioned between the upper substrate 210 and the upper polarizer 22.

Referring to FIG. 10, which is an enlarged view of an infrared ray sensor $Tr_2$ and a readout transistor $Tr_{readout}$ positioned in the "B" portion of FIG. 9, the infrared ray sensor $Tr_2$ and the readout transistor $Tr_{readout}$ that is electrically connected to the infrared ray sensor $Tr_2$ are disposed on the upper substrate 210.

In detail, the infrared ray sensor $Tr_2$ may include a gate electrode 124b on the upper substrate 210, a gate insulating layer 140b on the gate electrode 124b, an active layer 154b overlapping the gate electrode 124b on the gate insulating layer 140b and including at least one material selected from the group amorphous germanium, amorphous silicon-germanium, and microcrystalline silicon, an ohmic contact layer 164b on the active layer 154b, a source electrode 173b on the ohmic contact layer 164b, and a drain electrode 175b that is separated from the source electrode 173b on the ohmic contact layer 164b.

The infrared ray sensor $Tr_2$ may further include a visible ray blocking film 111 disposed on the active layer 154b and overlapping the active layer 154b. Since the visible ray blocking film 111 has a function of blocking the visible rays provided from outside of the sensing device, the visible ray blocking film 111 may be positioned either on or over the active layer 154b. The visible ray blocking film 111 is described with reference to FIG. 3 above so that a detailed description thereof will be omitted here. An insulating layer 194 that includes insulating material such as silicon nitride may be positioned between the visible ray blocking film 111 and the active layer 154b to provide electrical insulation between the visible ray blocking film 194 and the active layer 154b.

The readout transistor $Tr_{readout}$ may include a gate electrode 124r on the upper substrate 210, a gate insulating layer 140r on the gate electrode 124r, a semiconductor layer 154r overlapping the gate electrode 124r on the gate insulating layer 140r, an ohmic contact layer 164r on the semiconductor layer 154r, a source electrode 173r on the ohmic contact layer 164r, and a drain electrode 175r separated from the source electrode 173r on the ohmic contact layer 164r.

Figure 11:
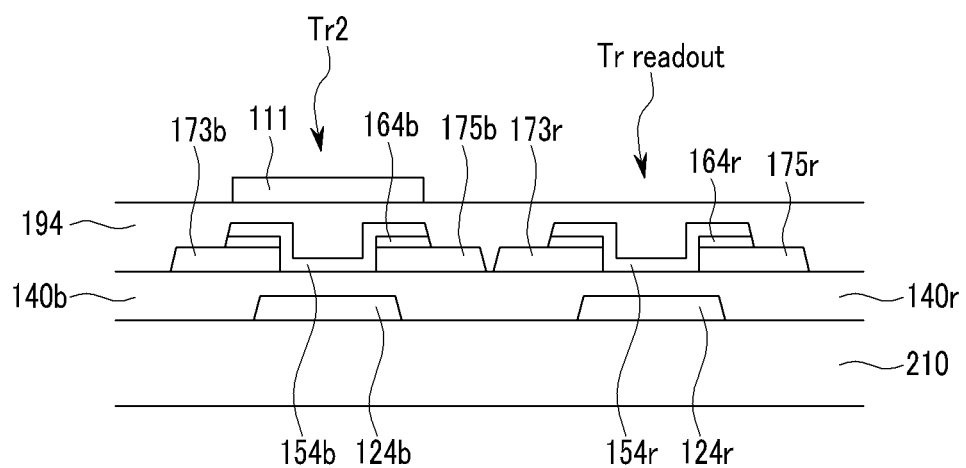
FIG. 11 is a cross-sectional view of an infrared ray sensor $Tr_2$ and a readout transistor $Tr_{readout}$ according to another exemplary embodiment.

FIG. 11 is a cross-sectional view of an infrared ray sensor $Tr_2$ and a readout transistor $Tr_{readout}$ according to another exemplary embodiment. The infrared ray sensor $Tr_2$ and the readout transistor $Tr_{readout}$ of FIG. 11 are substantially the same as those of FIG. 10, except for the positional relationship of the elements, and therefore the same reference numerals are used to refer to the same elements.

Referring to FIG. 11, an infrared ray sensor $Tr_2$ and a readout transistor $Tr_{readout}$ that is electrically connected to the infrared ray sensor $Tr_2$ are disposed on the upper substrate 210.

The infrared ray sensor $Tr_2$ includes a gate electrode 124b on the upper substrate 210, a gate insulating layer 140b on the gate electrode 124b, a source electrode 173b and a drain electrode 175b that are separated from each other and are on the gate insulating layer 140b, an active layer 154b overlapping the gate electrode 124b on the source electrode 173b and the drain electrode 175b, and an ohmic contact layer 164b between the source electrode 173b and the active layer 154b, and the drain electrode 175b and the active layer 154b.

Also, the infrared ray sensor $Tr_2$ may further include a visible ray blocking film 111 overlapping the active layer 154b and disposed on the active layer 154b. Since the visible ray blocking film 111 has the function of blocking the visible rays provided from outside of the sensing device, the visible ray blocking film 111 may be positioned either on or over the active layer 154b. The visible ray blocking film 111 is described with reference to FIG. 3 above and therefore a detailed description thereof will be omitted here. An insulating layer 194 that includes insulating material such as silicon nitride may be positioned between the visible ray blocking film 111 and the active layer 154b to provide electrical insulation between the visible ray blocking film 194 and the active layer 154b.

The readout transistor $Tr_{readout}$ may include a gate electrode 124r on the upper substrate 210, a gate insulating layer 140r on the gate electrode 124r, a source electrode 173r and a drain electrode 175r that are separated from each other and are on the gate insulating layer 140r, a semiconductor layer 154r overlapping the gate electrode 12 on the source electrode 173r and the drain electrode 175r, and an ohmic contact layer 164r between the source electrode 173r and the semiconductor layer 154r, and the drain electrode 175r and the semiconductor layer 154r.

FIG. 12 shows an enlarged view of a visible ray sensor $Tr_3$ and a readout transistor $Tr_{readout}$ disposed in the "C" portion of FIG. 9. Referring to FIG. 12, the visible ray sensor $Tr_3$ and the readout transistor $Tr_{readout}$ that is electrically connected to the visible ray sensor $Tr_3$ are disposed on the upper substrate 210.

In detail, the visible ray sensor $Tr_3$ may include a gate electrode 124c on the upper substrate 210, a gate insulating layer 140c on the gate electrode 124c, an active layer 154c that includes amorphous silicon and overlaps the gate electrode 124c on the gate insulating layer 140c, an ohmic contact layer 164c on the active layer 154c, a source electrode 173c on the ohmic contact layer 164c, and a drain electrode 175c separated from the source electrode 173c on the ohmic contact layer 164c. The structure of the readout transistor $Tr_{readout}$ is substantially the same as that of FIG. 10 above, and therefore a detailed description thereof will be omitted here.

Figure 13:
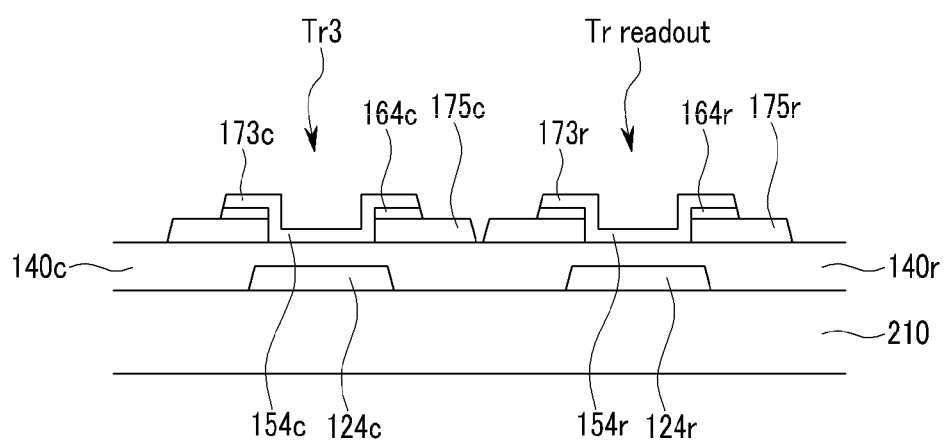
FIG. 13 is a cross-sectional view of a visible ray sensor $Tr_3$ and a readout transistor $Tr_{readout}$ according to another exemplary embodiment.

FIG. 13 is a cross-sectional view of a visible ray sensor $Tr_3$ and a readout transistor $Tr_{readout}$ according to another exemplary embodiment. The visible ray sensor $Tr_3$ and the readout transistor $Tr_{readout}$ of FIG. 13 are substantially the same as those of FIG. 12, except for the positional relationship of the elements, such that the same reference numerals are used to refer to the same elements.

Referring to FIG. 13, the visible ray sensor $Tr_3$ and the readout transistor $Tr_{readout}$ that is electrically connected to the visible ray sensor $Tr_3$ are disposed on the upper substrate 210.

The visible ray sensor $Tr_3$ includes a gate electrode 124c on the upper substrate 210, a gate insulating layer 140c on the gate electrode 124c, a source electrode 173c and a drain electrode 175c separated from each other on the gate insulating layer 140c, an active layer 154c overlapping the gate electrode 124c on the source electrode 173c and the drain electrode 175c, and an ohmic contact layer 164c disposed between the source electrode 173c and the active layer 154c, and the drain electrode 175c and the active layer 154c. The structure of the readout transistor $Tr_{readout}$ is substantially the same as that of FIG. 12 above, and therefore a detailed description thereof will be omitted here.

FIG. 14 is a view for explaining a method for sensing light using a sensing device according to an exemplary embodiment. The method for sensing light according to the present exemplary embodiment is described through the above-described light sensing display device of FIGS. 1 to 6, however the above-described light sensing display device of FIGS. 9 to 13 may be used.

Referring to FIG. 14, the infrared ray and the visible ray are generated from the backlight unit 910. The infrared ray sequentially passes the lower polarizer 12, the lower panel 100, the liquid crystal layer 3, the upper panel 200, and the upper polarizer 22. Also, the visible ray sequentially passes the lower polarizer 12, the lower panel 100, the liquid crystal layer 3, the upper panel 200, and the upper polarizer 22.

For the touch sensing of the first object $T_1$ positioned on the sensing device, the infrared ray provided from the backlight unit 910 may be used. In detail, when the first object $T_1$ is close to the sensing device, the infrared ray emitted from the sensing device is reflected by the first object $T_1$.

Next, the reflected infrared ray is incident to and detected by the infrared ray sensor $Tr_2$ positioned in the upper panel 200. Accordingly, the touch sensing for the first object $T_1$ is executed, thereby indicating the contact of the first object $T_1$, the position of the contact, and the information regarding the shape and the size of the contact.

Thus, for a sensing device that operates using only visible light, when, for instance, the external light is not sufficiently bright, or if, for instance, an insufficient amount of light emitted from such a sensing device arrives at the sensor, due, for instance, to a screen that is in a low gray level configuration, the sensing device may fail to detect the existence of the object. Such a problem may be solved by using infrared rays.

When using infrared rays, the infrared rays are passed through the dark screen that the visible ray cannot pass through in the sensing device such that the infrared rays are reflected, thereby detecting the object via the infrared ray sensor, and as a result the existence, the position, and the shape of the object may be easily recognized. Additional, detection of the object does not require a physical change in the sensing device, and therefore a high reliability may be obtained using infrared rays.

When the gray level of the visible rays emitted from the sensing device is brighter than the luminance of the visible rays incident to the sensing device from outside of the device, the visible rays emitted from the sensing device may be used for image sensing for the second object $T_2$, when it moves close to the sensing device. In this case, even if the sensing device is placed in a dark area, without sufficient ambient light, image sensing may be achieved by using the visible rays that are emitted from the sensing device itself.

In detail, the visible rays emitted from the sensing device are reflected by the second object $T_2$. The reflected visible rays are incident to and detected by the visible ray sensor $Tr_3$ positioned in the upper panel 200. Accordingly, image sensing for the second object $T_2$ is executed, and thereby the image information for the second object $T_2$, such as the shape, the size, and the color, may be obtained.

After confirming the contact of the second object $T_2$ through the touch sensing, the gray level of the visible rays emitted from the sensing device toward the contact may be selectively changed such that the image sensing for the second object $T_2$ may be further effectively executed.

For example, when the gray level of the visible rays emitted from the sensing device is darker than the gray level of the visible rays incident to the sensing device from outside of the sensing device, the touch sensing using the infrared ray is executed first. The gray level of the visible rays emitted from the sensing device toward the contact portion of the second object $T_2$ recognized through the touch sensing is then selectively brightened, so that effective image sensing for the second object $T_2$ is possible.

That is, when the existence of the object is recognized using the infrared rays, although the screen is dark overall, the portion of the screen where the object is identified as positioned is then displayed with a special gray level such that the image, including the shape of the object, may be recognized, and thereby the more complicated information may be scanned.

Also, as shown in FIG. 3 above, the visible ray blocking film 111 is positioned where the infrared rays and the visible rays are incident upward to the infrared ray sensor $Tr_2$. By using the visible ray blocking film 111, the visible rays incident to the infrared ray sensor $Tr_2$ is reduced such that the infrared ray sensitivity of the infrared ray sensor $Tr_2$ may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sensing device comprising:
a lower panel;
an upper panel facing the lower panel; and
a liquid crystal layer disposed between the lower panel and the upper panel, the upper panel including an upper substrate having a first surface facing a direction where an object to be sensed would be positioned and an opposite surface facing the liquid crystal layer, both the first surface and the opposite surface being planarized; a plurality of infrared ray sensors formed in the upper panel on the opposite surface, each infrared ray sensor including a visible ray blocking film contacting the opposite surface, an insulating layer covering and contacting the visible ray blocking film, an active layer disposed on and contacting the insulating layer, a source and drain electrode, each contacting the active layer, the insulating layer and the opposite surface, a gate insulating layer disposed on the active layer and the source and drain electrodes and contacting the opposite surface, and a gate electrode disposed under the active layer and gate insulating layer; and
a plurality of visible ray sensors formed in the upper panel on the opposite surface,
wherein the active layer includes a material capable of sensing both visible rays and infrared rays, and the material includes at least one of amorphous germanium and micro-crystalline silicon.

2. The sensing device of claim 1, further comprising
a pixel transistor disposed in the lower panel.

3. The sensing device of claim 2, wherein
the lower panel further comprises a color filter positioned on the pixel transistor.

4. The sensing device of claim 3, wherein
the lower panel further includes a black matrix between the color filters, and the black matrix overlaps at least one of the infrared ray sensor and the visible ray sensor.

5. The sensing device of claim 1, wherein a width of the gate electrode in a direction parallel to the opposite surface is smaller than a width of the active layer in the direction.

6. The sensing device of claim 1, wherein the lower panel includes pixel transistors connected to pixel electrodes and a black matrix positioned between the pixel transistors and pixel electrodes, and wherein each of the plurality of infrared ray sensors and the plurality of visible ray sensors are positioned on the upper panel to overlap vertically with the black matrix.

7. A sensing device comprising:
a lower panel including a lower substrate and a pixel transistor disposed on the lower substrate;
a liquid crystal layer disposed on the lower panel; and
an upper panel disposed on the liquid crystal layer and including an upper substrate having a first surface facing a direction where an object to be sensed would be positioned and an opposite surface facing the liquid crystal layer, an infrared ray sensor, a visible ray sensor, and a readout transistor connected to the infrared ray sensor or the visible ray sensor for transmitting a detection signal to a readout line, wherein both the first surface and the opposite surface are planarized, and wherein the infrared ray sensor includes a visible ray blocking film contacting the opposite surface, an insulating layer covering and contacting the visible ray blocking film, an active layer disposed on and contacting the insulating layer, a source and drain electrode, each contacting the active layer, the insulating layer and the opposite surface, a gate insulating layer on the active layer and the source and drain electrodes, and contacting the opposite surface, and a gate electrode disposed between the active layer and the liquid crystal layer,
wherein the active layer includes a material capable of sensing both visible rays and infrared rays, and the material includes at least one of amorphous germanium and micro-crystalline silicon.

8. The sensing device of claim 7, wherein
the lower panel further includes a color filter disposed on the pixel transistor.

9. The sensing device of claim 8, wherein
the lower panel further includes a black matrix between the color filters, and the black matrix overlaps at least one of the infrared ray sensor and the visible ray sensor.

10. The sensing device of claim 7, further comprising
a backlight unit including at least one infrared ray emitting member and at least one visible ray emitting member disposed under the lower panel.

11. The sensing device of claim 10, wherein
the infrared ray emitting member and the visible ray emitting member are light emitting diodes (LED), and
infrared rays and visible rays respectively emitted from the infrared ray emitting member and the visible ray emitting member are perpendicularly incident to the lower panel.

12. The sensing device of claim 11, wherein
the visible rays are white light.

13. The sensing device of claim 7, further comprising:
a lower polarizer disposed under the lower panel; and
an upper polarizer disposed on the upper panel.

14. The sensing device of claim 7, further comprising:
a lower IC unit electrically connected to the pixel transistor for driving the lower panel, and disposed on a side of the lower panel; and
an upper IC unit electrically connected to the infrared ray sensor and the visible ray sensor for driving the upper panel, and disposed on a side of the upper panel.

15. The sensing device of claim 14, wherein
the lower IC unit and the upper IC unit do not overlap each other.

16. The sensing device of claim 15, wherein
the lower IC unit and the upper IC unit are opposite to each other with respect to the liquid crystal layer.

17. A method for sensing light by using a sensing device, comprising:
providing a sensing device including an upper substrate having a first surface facing an object to be sensed and a second surface opposite the first surface, an infrared ray sensor and a visible ray sensor, the infrared ray sensor including a visible ray blocking film contacting the opposite surface, an insulating layer covering and contacting the visible ray blocking film, an active layer disposed on and contacting the insulating layer, a source and drain electrode, each contacting the active layer, the insulating layer and the opposite surface, a gate insulating layer disposed on the active layer and the source and drain electrodes and contacting the opposite surface, and a gate electrode disposed under the active layer and gate insulating layer, wherein both the first surface and the second surface are planarized, and wherein the active layer includes a material capable of sensing both visible rays and infrared rays, and the material includes at least one of amorphous germanium and micro-crystalline silicon;
emitting an infrared ray and a visible ray from the sensing device;
disposing the object close to the upper substrate of the sensing device; and
sensing the infrared ray or the visible ray reflected by the object through the infrared ray sensor or the visible ray sensor, thereby obtaining information of the object.

18. The method of claim 17, wherein
the information obtained by detecting the infrared ray reflected by the object through the infrared ray sensor is contact information of the object.

19. The method of claim 17, wherein
the information obtained by detecting the visible ray reflected by the object through the visible ray sensor is image information of the object.

20. The method of claim 17, wherein
the obtaining of the information of the object includes:
recognizing the contact position of the object by detecting the infrared ray reflected by the object through the infrared ray sensor; and
selectively changing the gray level of the visible ray provided to the contact position, thereby recognizing the image information of the object by detecting the visible ray reflected by the object through the visible ray sensor.

21. The method of claim 20, wherein
the selectively changing the gray level of the visible ray is to control the gray level.

22. The method of claim 17, wherein
the sensing device includes:
a lower panel;
an upper panel facing the lower panel; and
a liquid crystal layer disposed between the lower panel and the upper panel,
wherein the infrared ray sensor is formed in at least one of the lower panel and the upper panel, and
the visible ray sensor is formed in at least one of the lower panel and the upper panel.

23. The method of claim 22, further comprising
a pixel transistor positioned in the lower panel.

24. The method of claim 23, wherein
the infrared ray sensor and the visible ray sensor are formed in the upper panel.

25. The method of claim 17, wherein
the infrared ray sensor includes a visible ray blocking film,
wherein the visible ray blocking film reduces a number of visible rays incident to the infrared ray sensor such that the sensitivity of the infrared ray of the infrared ray sensor is increased.

* * * * *